United States Patent
Ito et al.

(10) Patent No.: US 9,085,298 B2
(45) Date of Patent: Jul. 21, 2015

(54) POWER TRANSMISSION CONTROL DEVICE FOR VEHICLE

(75) Inventors: Yoshiki Ito, Aichi-ken (JP); Takeshige Miyazaki, Chiryu (JP); Mitsuhiro Tabata, Shizuoka-ken (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 78 days.

(21) Appl. No.: 13/984,376

(22) PCT Filed: Feb. 8, 2012

(86) PCT No.: PCT/JP2012/052864
§ 371 (c)(1),
(2), (4) Date: Sep. 19, 2013

(87) PCT Pub. No.: WO2012/108466
PCT Pub. Date: Aug. 16, 2012

(65) Prior Publication Data
US 2014/0011632 A1    Jan. 9, 2014

(30) Foreign Application Priority Data

Feb. 9, 2011 (JP) .................. 2011-025700

(51) Int. Cl.
*B60W 20/00* (2006.01)
*B60K 6/48* (2007.10)
(Continued)

(52) U.S. Cl.
CPC .................. *B60W 20/30* (2013.01); *B60K 6/48* (2013.01); *B60L 11/14* (2013.01); *B60L 11/1861* (2013.01); *B60L 15/20* (2013.01); *B60W 10/02* (2013.01);
(Continued)

(58) Field of Classification Search
CPC .......... B60W 20/00; B60W 2510/101; B60W 2540/16; F16H 2059/6823; B60L 2250/24; B60Y 2400/77
See application file for complete search history.

(56) References Cited

U.S. PATENT DOCUMENTS 4,400,997 A * 8/1983 Fiala .............................. 74/661
6,712,165 B1    3/2004 Okazaki
(Continued)

FOREIGN PATENT DOCUMENTS

| JP | 05-222946 A1 | 8/1993 |
| JP | 2000-224710 A1 | 8/2000 |

(Continued)

OTHER PUBLICATIONS

International Search Report and Written Opinion dated Apr. 24, 2012.

*Primary Examiner* — Sherry Estremsky
(74) *Attorney, Agent, or Firm* — Burr & Brown, PLLC

(57) ABSTRACT

A power transmission control device, which is applied to a hybrid-vehicle provided with an internal combustion engine (E/G) and a motor (M/G) as power sources, includes a manual transmission and a friction clutch. When the shift position is in "neutral", the friction clutch is in an engaged state, an accelerator opening is "0", and a battery remaining amount SOC is less than a threshold TH, a charge condition is satisfied. When the charge condition is satisfied, charge of a battery by using an E/G torque is carried out. Specifically, the M/G is driven, by using the E/G torque, as an electrical power generator, and electric energy acquired by electric power generation by the M/G is used to charge the battery. As a result, for the HV-MT vehicle, by using the internal-combustion-engine torque, the battery for supplying the electric motor with the electric energy can be efficiently charged.

6 Claims, 4 Drawing Sheets

(51) Int. Cl.
  *B60W 10/02* (2006.01)
  *B60W 10/06* (2006.01)
  *B60W 10/08* (2006.01)
  *B60W 10/11* (2012.01)
  *B60W 10/26* (2006.01)
  *F02D 29/02* (2006.01)
  *B60L 11/14* (2006.01)
  *B60L 11/18* (2006.01)
  *B60L 15/20* (2006.01)
  *F16H 59/68* (2006.01)

(52) U.S. Cl.
  CPC ............... *B60W 10/06* (2013.01); *B60W 10/08* (2013.01); *B60W 10/11* (2013.01); *B60W 10/26* (2013.01); *B60W 20/00* (2013.01); *F02D 29/02* (2013.01); *B60L 2210/40* (2013.01); *B60L 2220/14* (2013.01); *B60L 2240/423* (2013.01); *B60L 2240/443* (2013.01); *B60L 2250/26* (2013.01); *B60W 20/106* (2013.01); *B60W 2510/0208* (2013.01); *B60W 2510/101* (2013.01); *B60W 2510/244* (2013.01); *B60W 2540/10* (2013.01); *B60W 2540/16* (2013.01); *B60Y 2400/71* (2013.01); *F16H 2059/6823* (2013.01); *Y02T 10/6221* (2013.01); *Y02T 10/6286* (2013.01); *Y02T 10/642* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7241* (2013.01); *Y02T 10/7275* (2013.01); *Y10S 903/902* (2013.01); *Y10T 477/26* (2015.01)

(56) References Cited

U.S. PATENT DOCUMENTS

2002/0116099 A1  8/2002  Tabata et al.
2004/0158365 A1  8/2004  Tabata et al.

FOREIGN PATENT DOCUMENTS

| JP | 2000-343965 A1 | 12/2000 |
| JP | 2001-235030 A1 | 8/2001 |
| JP | 2002-089307 A1 | 3/2002 |
| JP | 2007-030599 A1 | 2/2007 |
| JP | 2010-030329 A1 | 2/2010 |

* cited by examiner

POWER TRANSMISSION CONTROL DEVICE FOR VEHICLE

TECHNICAL FIELD

The present invention relates to a power transmission control device for a vehicle, and more particularly, to a power transmission control device applied to a vehicle provided with an internal combustion engine and an electric motor as power sources, and including a friction clutch.

BACKGROUND ART

Conventionally, a so-called hybrid vehicle provided with an internal combustion engine and an electric motor (an electric motor and an electric power generator) as power sources is widely known (for example, see Japanese Patent Application Laid-open No. 2000-224710). In recent years, a vehicle (hereinafter referred to as "HV-MT vehicle"), which is a hybrid vehicle and is provided with a manual transmission and a friction clutch, has been under development. In this context, "manual transmission" is a transmission (so-called MT) without a torque converter, in which one of a plurality of gear positions is selected based on a shift position of a shift lever operated by a driver. Moreover, the "friction clutch" is a clutch interposed between an output shaft of an internal combustion engine and an input shaft of a manual transmission, and an engaged state of the friction plate changes based on an operation amount of the clutch pedal operated by the driver. Now, a torque of the output shaft of the internal combustion engine is hereinafter referred to as "internal-combustion-engine torque", and a torque of the output shaft of the electric motor is referred to as "electric-motor torque".

SUMMARY OF INVENTION

On the HV-MT vehicle, a configuration of connecting the output shaft of the electric motor to any one of the output shaft of the internal combustion engine, the input shaft of the transmission, and the output shaft of the transmission may be employed. Now, a configuration in which the output shaft of the electric motor is connected to the input shaft of the transmission is considered.

On the HV-MT vehicle, when a remaining amount (amount of accumulated (chemical) energy) of the battery for providing the electric motor with electric energy becomes small, the battery needs to be charged. In order to charge the battery, by using some electric power generation means, electric energy for charging the battery needs to be generated.

On this occasion, as mentioned above, in the configuration in which the output shaft of the electric motor is connected to the input shaft of the transmission, when the friction clutch is in the engaged state, the internal-combustion-engine torque can be transmitted via the friction clutch to the output shaft of the electric motor. In other words, by using the internal-combustion-engine torque to rotationally drive the electric motor as an electric power generator, the electric energy for charging the battery can be generated.

On the other hand, when the friction clutch is in the engaged state, and the gear position of the transmission is selected to a gear position for travel (namely, the a power transmission route is realized between the output shaft of the electric motor and the output shaft of the transmission), a part of the internal-combustion-engine torque is transmitted to drive wheels of the vehicle, and is consumed for driving the vehicle. In this case, it is impossible to use the internal-combustion-engine torque to rotationally drive the electric motor efficiently as the electric power generator, and thus, the electric energy for charging the battery cannot be efficiently generated.

The present invention is devised to address the above-mentioned problem, and has an object of providing a power transmission control device intended for an HV-MT vehicle for efficiently charging, by using the internal-combustion-engine torque, a battery for supplying an electric motor with electric energy.

A power transmission control device for a vehicle according to the present invention is applied to a vehicle having an internal combustion engine and an electric motor as power sources. The power transmission control device includes a transmission, a friction clutch, and control means.

The transmission is a manual transmission without a torque converter, in which one of a plurality of gear positions is selected based on a shift position of a shift operation member operated by a driver. The transmission includes an input shaft for receiving an input of a power from an output shaft of the internal combustion engine, and an output shaft for outputting a power to drive wheels of the vehicle. The electric motor has an output shaft connected to the input shaft of the transmission.

The friction clutch is interposed between the output shaft of the internal combustion engine and the input shaft of the transmission for selectively realizing an engaged state, which is a state in which the power is transmitted, and a disengaged state, which is a state in which the power is not transmitted, based on an operation on a clutch operation member operated by the driver. More specifically, as the engaged state, there is a fully engaged state in which the power is transmitted without a slip, and a partially engaged state in which the power is transmitted with a slip. When the operation of the clutch operation member by the driver is not being carried out, the friction clutch realizes the fully engaged state.

The control means controls a drive torque of the output shaft of the internal combustion engine (internal-combustion-engine torque) and a drive torque of the output shaft of the electric motor (electric-motor torque).

This power transmission control device has a feature in that the control means drives, based on the satisfaction of the charge condition, by using the internal-combustion-engine torque, the electric motor as an electric power generator, and charges, by using the electric energy acquired by the electric power generation by the electric motor, the battery for supplying the electric motor with the electric energy.

On this occasion, the charge condition includes a determination that the detected shift position is a "driving force non-requesting position", which is a position corresponding to a state in which a power transmission route is not realized between the output shaft of the electric motor and the output shaft of the transmission, and a determination, based on the detected operation amount of the clutch operation member, that the friction clutch is in the engaged state (namely, the fully engaged state or the partially engaged state). The "driving force non-requesting position" is a shift position corresponding to a state in which the driver does not request the driving force. The "driving force non-requesting position" typically corresponds to a state in which a power transmission route is not realized between the input shaft and the output shaft of the transmission. In this case, the "driving force non-requesting position" is, for example, a neutral (N) position.

According to the above-mentioned configuration, in the state in which the friction clutch is in the engaged state and the power transmission route is not realized between the output shaft of the electric motor and the output shaft of the transmission, the electric motor can be driven as an electric power generator by using the internal-combustion-engine torque. Thus, a part of the internal-combustion-engine torque is not transmitted to the drive wheels of the vehicle, and a part of the internal-combustion-engine torque is not consumed for driving the vehicle. As a result, the electric motor can be efficiently rotationally driven as an electric power generator by using the internal-combustion-engine torque, and the electric energy for the battery charge can be efficiently generated. In other words, in the state in which the driver is not requesting the driving force (whether the vehicle is traveling or stopped), by using the internal-combustion-engine torque, the battery for supplying the electric motor with the electric energy can be efficiently charged.

It is preferred that the charge condition include a determination that an amount of energy accumulated in the battery is less than a predetermined value. As a result, the charge of the battery when the amount of the energy accumulated in the battery is small is surely secured.

In addition, it is preferred that the charge condition include a determination that an acceleration operation member operated by the driver to accelerate the vehicle is not being operated. As a result, "the charge of the battery in the state in which the driver is not requesting the driving force" can be more surely secured.

If the internal combustion engine is operating when the charge condition is satisfied, the drive of the electric motor can be immediately started by using the internal-combustion-engine torque which is already generated. On the other hand, if the internal combustion engine is stopped when the charge condition is satisfied, it is necessary to start the internal combustion engine, thereby generating the internal-combustion-engine torque. In this case, the start of the internal combustion engine (namely, rotational drive of the output shaft of the internal combustion engine) can be carried out by using a starter motor.

By the way, even if the shift position is the "driving force non-requesting position", when the friction clutch is in the disengaged state, the electric motor cannot be rotationally driven by using the internal-combustion-engine torque. In this case, a configuration in which, in place of the electric motor, an "alternator driven by the internal-combustion-engine torque" is driven by using the internal-combustion-engine torque, and electric energy acquired by the electric power generation by the alternator is used to charge the battery can be provided.

DESCRIPTION OF EMBODIMENTS

Figure 1:
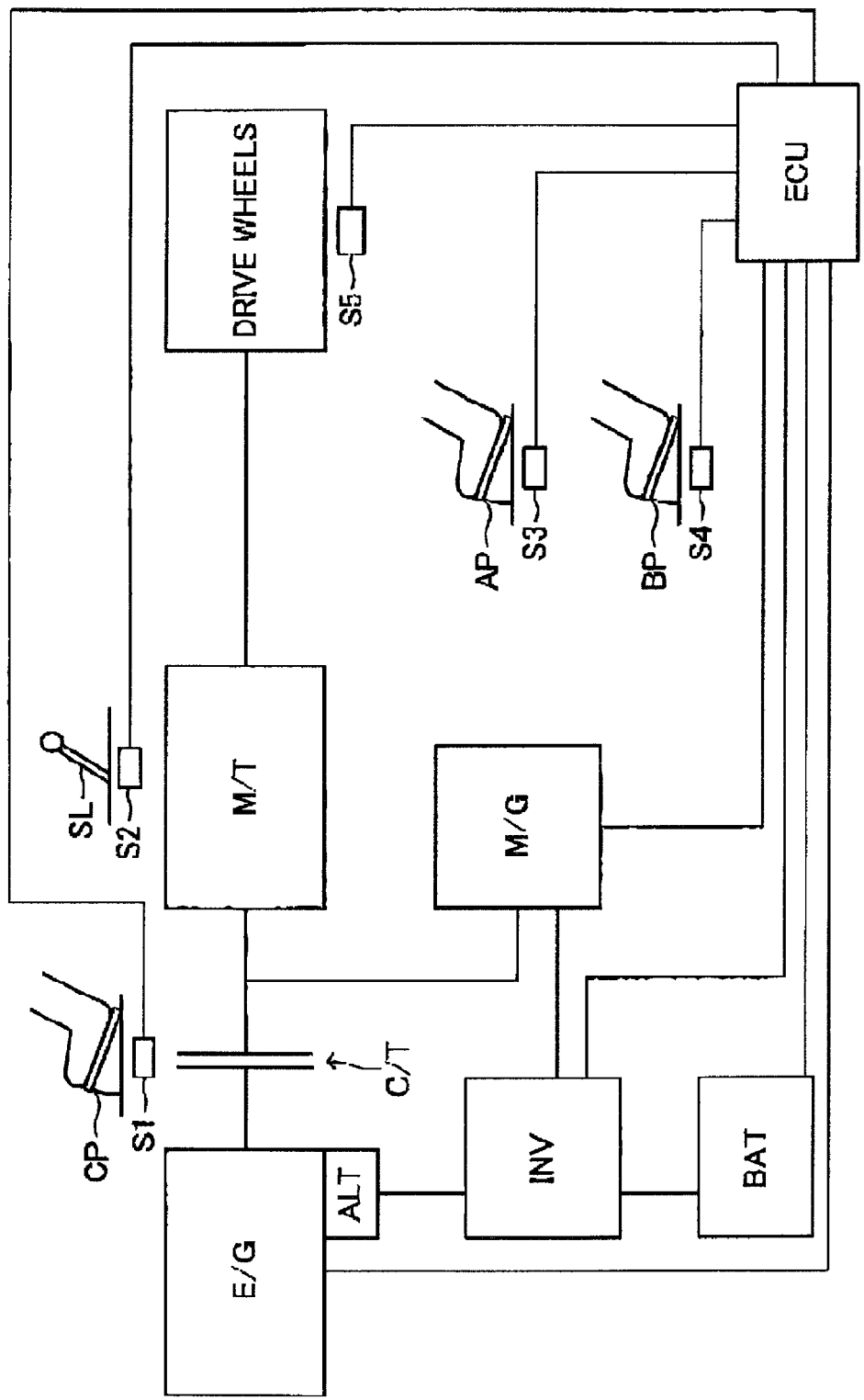
FIG. 1 A schematic configuration diagram of an HV-MT vehicle equipped with a power transmission control device according to en embodiment of the present invention.

A description is now given of en embodiment of a power transmission control device for a vehicle according to the present invention, referring to the drawings.

(Configuration)

FIG. 1 illustrates a schematic configuration of a vehicle equipped with a power transmission control device (hereinafter referred to as "this device") according to an embodiment of the present invention. This vehicle is a hybrid vehicle provided with an engine E/G and a motor/generator M/G as power sources, and also provided with a manual transmission M/T without a torque converter, and a friction clutch C/T. In other words, this vehicle is the above-mentioned HV-MT vehicle.

The engine E/G is a known internal combustion engine, and is, for example, a gasoline engine using gasoline as a fuel or a diesel engine using light oil as a fuel.

The manual transmission M/T is a transmission without a torque converter, in which one of a plurality of gear positions is selected based on a shift position of a shift lever SL operated by the driver. The M/T includes an input shaft for receiving an input of a power from the output shaft of the E/G, and an output shaft for outputting a power to drive wheels of the vehicle.

The M/T includes, as gear positions, for example, five forward gear positions (first to fifth), one reverse gear position (reverse), and a "neutral" position. When a forward gear position or a backward gear position is selected, a power transmission route is realized between the input shaft and the output shaft of the M/T. On the other hand, when the "neutral" position is selected, the power transmission route is not realized between the input shaft and the output shaft of the M/T.

The gear positions of the M/T may be mechanically selected/changed by using a link mechanism or the like, which mechanically couples the shift lever SL and a sleeve (not shown) inside the M/T, based on the shift position of the shift lever SL, or may be selected/changed electrically (by means of the so-called by-wire method) by using a driving force of an actuator which operates based on a detection result by a sensor (sensor S2 described later) for detecting the shift position of the shift lever SL.

The friction clutch C/T is interposed between the output shaft of the E/G and the input shaft of the M/T. The C/T is a known clutch having an engaged state of a friction plate (more specifically, with respect to a flywheel, which integrally rotates with the output shaft of the E/G, a position in the axial direction of the friction plate, which integrally rotates with the input shaft of the M/T), which changes based on an operation amount (depressed amount) of a clutch pedal CP operated by the driver.

The states of the C/T include a fully engaged state, a partially engaged state, and a fully disengaged state. The fully engaged state refers to a state of transmitting the power without a slip. The partially engaged state refers to a state of transmitting the power with a slip. The fully engaged state and the partially engaged state correspond to "the engaged state". The fully disengaged state refers to a state of not transmitting the power. Now, from a fully depressed state of the clutch pedal CP, an operation amount in a returning direction of the clutch pedal CP is hereinafter referred to as "clutch return stroke".

The clutch return stroke is "0" in a state in which the clutch pedal CP is fully depressed, and takes the maximum value in a state in which the clutch pedal CP is released (is not operated). As the clutch return stroke increases from "0", the C/T transitions from the fully disengaged state, via the partially engaged state, to the fully engaged state.

The engaged state of the C/T (the axial position of the friction plate) may be mechanically adjusted based on the operation amount of the CP by using a link mechanism or the like for mechanically coupling the clutch pedal CP and the C/T (friction plate), or may be adjusted electrically (by means or the so-called by-wire method) by using a drive force of an actuator which operates based on a detection result by a sensor (sensor S1 described later) for detecting the operation amount of the CP.

The motor/generator M/G has one of known structures (such as AC synchronous motor), and, for example, a rotor (not shown) is configured so as to integrally rotate with the output shaft of the M/G. The output shaft of the M/G is connected so as to be able to transmit a power via a known gear train or the like to the input shaft of the M/T. Now, a torque of the output shaft of the E/G is hereinafter referred to as "EG torque", and a torque of the output shaft of the M/G is referred to as "MG torque".

The M/G generates a rotational driving torque (=MG torque) by using the electric energy supplied from a battery BAT. The magnitude of the MG torque can be adjusted by controlling an inverter INV. The MG torque is transmitted to the drive wheels of the vehicle via the M/T. On the other hand, the M/G functions as an electric power generator by being rotationally driven from the outside, and the battery BAT can be charged by using the electric energy acquired by the electric power generation by the M/G. The charge speed (charge amount per unit time) of the battery BAT can be adjusted by controlling the inverter INV.

Note that, the charge of the battery BAT can be carried out also by electric energy acquired by the electric power generation by an alternator ALT rotationally driven by the EG torque. Also in this case, the charge speed (charge amount per unit time) of the battery RAT can be adjusted by controlling the inverter INV.

This device includes the clutch operation amount sensor S1 for detecting the clutch return stroke of the clutch pedal CP, the shift position sensor S2 for detecting the position of the shift lever SL, an accelerator operation amount sensor S3 for detecting an operation amount of an accelerator pedal AP (accelerator opening), a brake operation amount sensor S4 for detecting an operation amount of a brake pedal BP (such as depressing force and presence/absence of operation), and a wheel speed sensor S5 for detecting a speed of a wheel.

Further, this device includes an electronic control unit ECU. The ECU controls, based on information from the above-mentioned sensors S1 to S5 and other sensors and the like, and other such information, a fuel injection amount (opening of a throttle valve) of the E/G, thereby controlling the EG torque, and controls an inverter INV, thereby controlling the magnitude of the MG torque and the speed of charging the battery BAT.

A ratio between the EG torque and the MG torque is adjusted based on the information from the sensors S1 to S5 and other sensors and the like, and other such information. The magnitudes of the EG torque and the MG torque are respectively adjusted mainly based on the accelerator opening. In particular, in this example, the MG torque is adjusted in the following manner.

Figure 2:
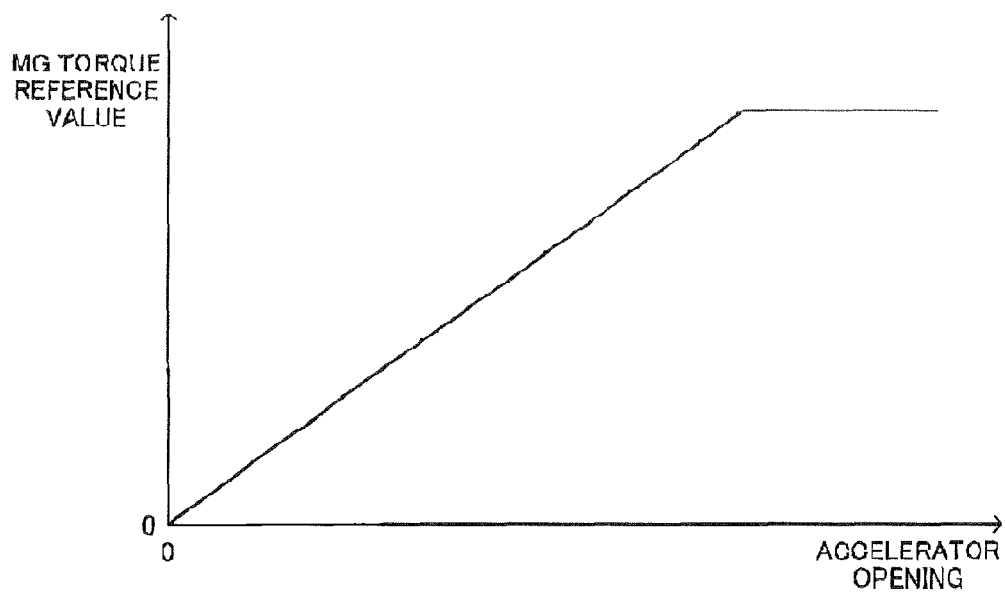
FIG. 2 A graph showing a map referred to by the power transmission control device illustrated in FIG. 1, and prescribing a relationship between an accelerator opening and an MG torque reference value.

Specifically, first, based on a map shown in FIG. 2 and a current accelerator opening, an "MG torque reference value" is determined. The MG torque reference value is determined to be a larger value as the accelerator opening increases. The characteristic of the MG torque reference value with respect to the accelerator opening can change according to various states (such as a ratio between the EG torque and the MG torque) other than the accelerator opening.

Figure 3:
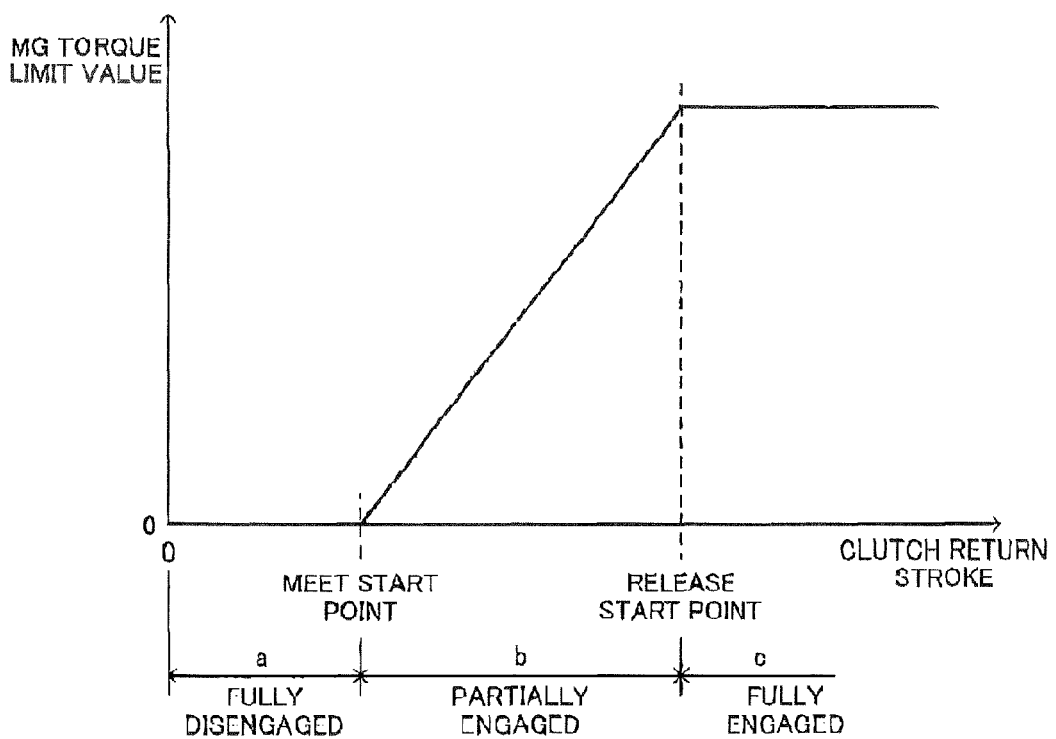
FIG. 3 A graph showing a map referred to by the power transmission control device illustrated in FIG. 1, and prescribing a relationship between a clutch return stroke and an MG torque limit value.

Moreover, based on a map shown in FIG. 3 and a current clutch return stroke, an "MG torque limit value" is determined. The MG torque limit value is defined by using a meet start point and a release start point. The meet start point is a clutch return stroke corresponding to a timing at which the C/T transitions from the fully disengaged state to the partially engaged state, and the release start point is a clutch return stroke corresponding to a timing at which the C/T transitions from the fully engaged state to the partially engaged state.

In this example, in a range of the clutch return stroke from "0" to the "meet start point" (namely, a range corresponding to the fully disengaged state of the C/T; refer to "range a" of FIG. 3), the MG torque limit value maintains "0", in a range of the clutch return stroke larger than the "release start point" (namely, a range corresponding to the fully engaged state of the C/T; refer to "range c" of FIG. 3), the MG torque limit value maintains the "maximum value", and, in a range of the clutch return stroke between the "meet start point" and the "release start point" (namely, a range corresponding to the partially engaged state of the C/T; refer to "range b" of FIG. 3), as the clutch return stroke transitions from the "meet start point" to the "release start point", the MG torque limit value increases from "0". The above-mentioned "maximum value" of the MG torque limit value can be set, for example, to a value equivalent to the current "MG torque reference value" described above. The maps shown in FIGS. 2 and 3 are stored in an updatable manner in a predetermined area of a memory of the ECU.

Then, the magnitude of the MG torque is generally adjusted to a smaller value (hereinafter referred to as "MG torque final reference value") out of the determined "MG torque reference value" and "MG torque limit value" described above. When the shift position of the shift lever SL is in neutral, the magnitude of the MG torque is maintained to "0".

As mentioned above, the magnitude of the MG torque is usually adjusted, within a range of the "MG torque limit value" determined based on the clutch return stroke, to a value based on the "MG torque reference value" (=MG torque final reference value) determined based on the accelerator opening and the like. In this way, by adjusting the magnitude of the MG torque so as to coincide with the MG torque final reference value, driving feeling using the MG torque of the HV-MT vehicle can be made close to driving feeling using the EG torque of an "ordinary MT vehicle". The ordinary MT vehicle refers to a conventionally widely known vehicle including a manual transmission and a friction clutch, and equipped with only an internal combustion engine as a power source.

(Charge of Battery by Using EG Torque)

In the HV-MT vehicle illustrated in FIG. 1, when the remaining amount SOC of the battery BAT (amount of accumulated (chemical) energy, state of charge) is small, the battery BAT needs to be charged. In this device, the output shaft of the M/G is connected to the input shaft of the M/T. In this configuration, when the C/T is in the engaged state, the EG torque is transmitted via the C/T to the output shaft of the M/G.

In other words, in this device, by using the EG torque to rotationally drive the M/G as an electric power generator, the electric energy for charging the battery can be generated.

Based on this knowledge, this device charges the battery BAT.

Figure 4:
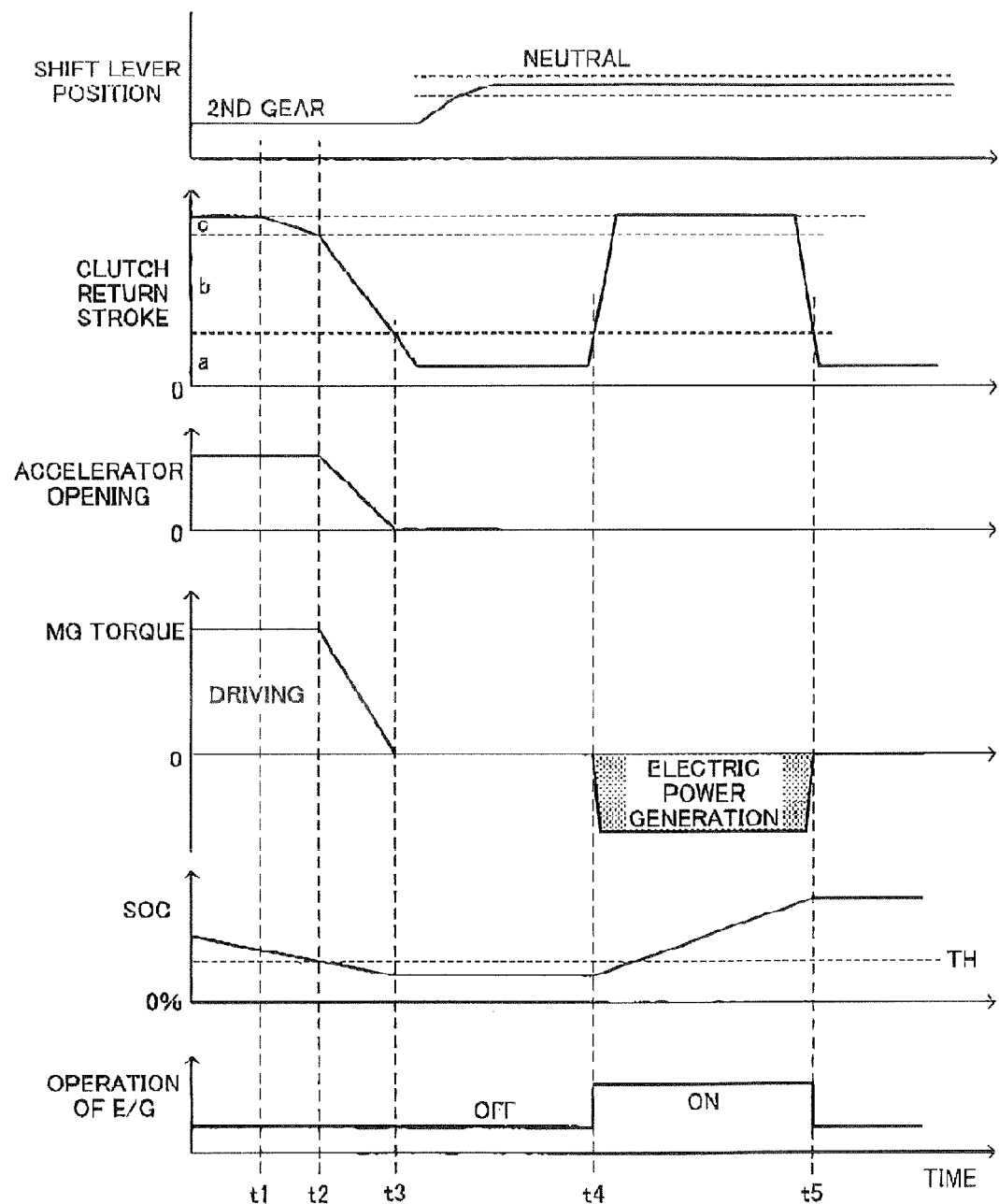
FIG. 4 A time chart showing an example of an operation in a case where a battery is charged by using an EG torque.

Referring to FIG. 4, a description is now given of this charge. In the example illustrated in FIG. 4, before a time t1, the vehicle is traveling, in a state in which the E/G is stopped, consuming the energy accumulated in the battery BAT, by using only the MG torque, at a "second speed". Before the time t1, MG torque >0, EG torque=0, the accelerator opening >0, and the C/T is in the fully engaged state. The travel by using the MG torque causes the battery remaining amount SOC to gradually decrease.

After the time t1, resulting from a condition that the driver no longer requests the driving force, the driver operates, in order to change the shift position from the "second speed" to "neutral", the accelerator pedal AP, the clutch pedal CP, and the shift lever SL in a cooperative manner.

In this example, focusing on the operation of the clutch pedal CP, at the time t1, the operation of the clutch pedal CP starts, at a time t2, the clutch return stroke transitions from a range c to a range b (the C/T transitions from the fully engaged state to the partially engaged state), at a time t3, the clutch return stroke transitions from the range b to a range a (the C/T transitions from the partially engaged state to a fully disengaged state), and, after a time t3, the C/T is maintained in the fully disengaged state.

Focusing on the operation of the accelerator pedal AP, at the time t2, the accelerator opening starts decreasing toward "0", and, from the time t3, the accelerator opening is maintained to "0". As a result, at the time t2, the MG torque also starts decreasing toward "0", and, from the time t3, is maintained to "0". As a result, after the time t3, the battery remaining amount SOC is already less than a threshold TH. The threshold TH corresponds to a lower limit value of the battery remaining amount required for stably rotationally driving the M/G, or the like.

Focusing on the operation of the shift lever SL, the shift operation from the "second speed" to "neutral" is carried out after the time t3 when the C/T is in the fully disengaged state.

In this example, after the completion of the shift operation from the "second speed" to "neutral", the clutch return stroke returns from the range a via the range b to the range c. As a result, at a time t4, the C/T transitions from the fully disengaged state to the engaged state (specifically, the partially engaged state). In other words, at the time t4, the shift position is in "neutral", the C/T is in the engaged state, the accelerator opening is "0", and the battery remaining amount SOC is less than the threshold TH.

In this device, based on a determination that the shift position is in "neutral", the C/T is in the engaged state, the accelerator opening is "0", and the battery remaining amount SOC is less than the threshold TH, a charge condition is satisfied. This device carries out, when the charge condition is satisfied, the charge of the battery BAT by using the EG torque. Specifically, the M/G is driven, by using the EG torque, as an electrical power generator, and, by using the electric energy acquired by the electric power generation by the M/G, the battery BAT is charged. The charge of the battery BAT continues until the C/T is returned to the fully disengaged state.

In the example shown in FIG. 4, the charge condition is satisfied at the time t4. Thus, after the time t4, by using the EG torque to drive the M/G as an electric power generator the battery BAT is charged. In the example shown in FIG. 4, the E/G stops before the time t4. Thus, in order to generate the EG torque after the time t4, at the time t4, the E/G is started. The start of the E/G is carried out by using a starter motor (not shown). As a result, after the time t4, the battery remaining amount SOC increases.

In the example shown in FIG. 4, after the battery remaining amount SOC exceeds the threshold TH, the clutch return stroke is returned again from the range c via the range b to the range a. As a result, at a time t5, the C/T transitions from the partially engaged state to the fully disengaged state. Thus, at the time t5, the charge of the battery BAT is finished. Accordingly, the E/C is stopped again.

In this way, according to this device, in a state in which the friction clutch C/T is in the engaged state and the shift position is in neutral (namely, the power transmission route between the output shaft of the M/G and the output shaft of the M/T is not realized), the EC torque is used to drive the M/G as an electric power generator. Thus, a part of the EG torque is not transmitted to the drive wheels of the vehicle, and the part of the EG torque is thus not consumed for driving the vehicle. As a result, by using the EG torque, the M/G, as an electric power generator, can be efficiently rotationally driven. As a result, the electric energy for the battery charge can be efficiently generated. In other words, in a state in which the driver is not requesting the driving force irrespective of whether the vehicle is traveling or stopped, the EG torque can be used to charge the battery BAT efficiently.

The present invention is not limited to the above-mentioned embodiment, and various modifications can be employed within the scope of the present invention. For example, according to the above-mentioned embodiment, in a state in which the friction clutch C/T is in the engaged state and the shift position is in neutral, by using the EG torque to drive the M/G as an electric power generator, the electric energy for the battery charge is generated. In contrast, when the C/T is in the disengaged state, the M/G cannot be driven by using the EG torque. In this case, a configuration in which, in place of the M/G, the alternator ALT is driven by using the EG torque, and electric energy acquired by the electric power generation by the alternator ALT is used to charge the battery BAT can be provided.

Moreover, though, according to the above-mentioned embodiment, as the charge condition, "a determination that the shift position is in neutral, the C/T is in the engaged state, the accelerator opening is "0", and the battery remaining amount SOC is less than the threshold TH" is employed, any one or both of "the accelerator opening being "0"" and "the battery remaining amount SOC being less than the threshold TH" may be omitted.

Moreover, in the above-mentioned example shown in FIG. 4, a case where the E/G is stopped and the charge conditions is satisfied (see the time t4) is described, however, there may also be a case where the E/G is operating and the charge condition is satisfied. In this case, by continuing the operation of the E/G after the satisfaction of the charge condition, and by using the EG torque which is already generated, the drive of the M/G as an electric power generator can be immediately started.

Moreover, according to the above-mentioned embodiment, though the charge of the battery BAT starts at a transition time point (see the time t4 in FIG. 4) from the fully disengaged state to the partially engaged state of the C/T, and ends at the transition time point (see the time t5 in FIG. 4) from the partially engaged state to the fully disengaged state of the C/T, the charge of the battery BAT may start at the transition time point from the partially engaged state to the fully engaged state of the C/T, and end at the transition time point (see the time t5 in FIG. 4) from the fully engaged state to the partially engaged state of the C/T.

Moreover, according to the above-mentioned embodiment, though the determination that "the C/T is in the engaged state" is made based on the clutch return stroke (detection result by the clutch operation amount sensor S1), the determination that "the C/T is in the engaged state" may be made based on a determination that "the rotation speed of the output shaft of the engine E/G coincides with the rotation speed of the input shaft of the manual transmission M/T".

Figure 5:
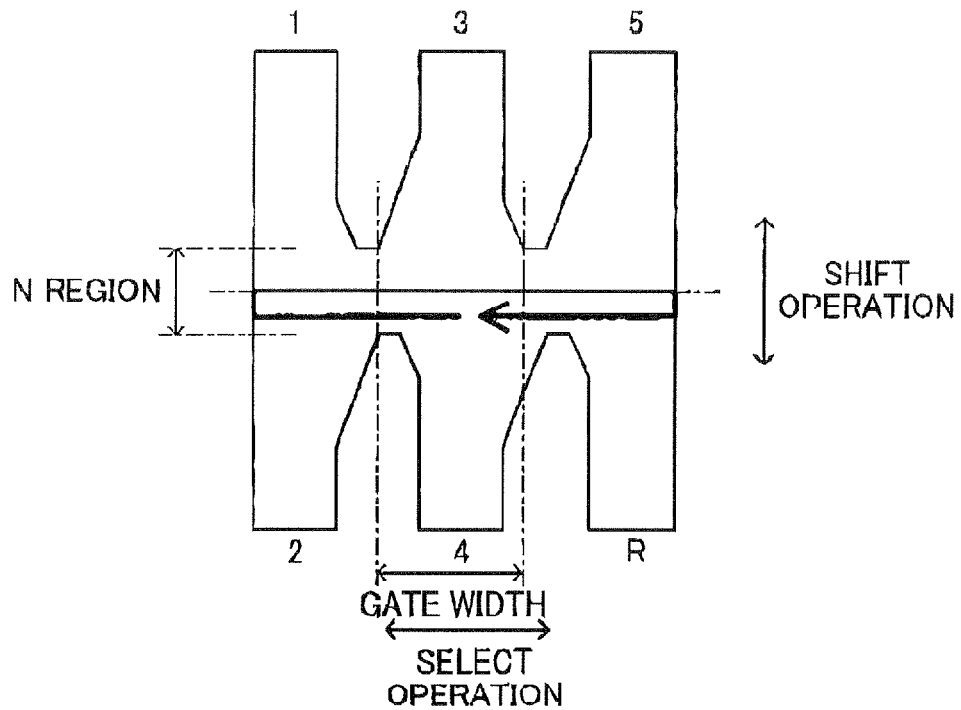
FIG. 5 A view illustrating an example of a determination method for a condition that "a shift position of a shift lever is in neutral".
Figure 6:
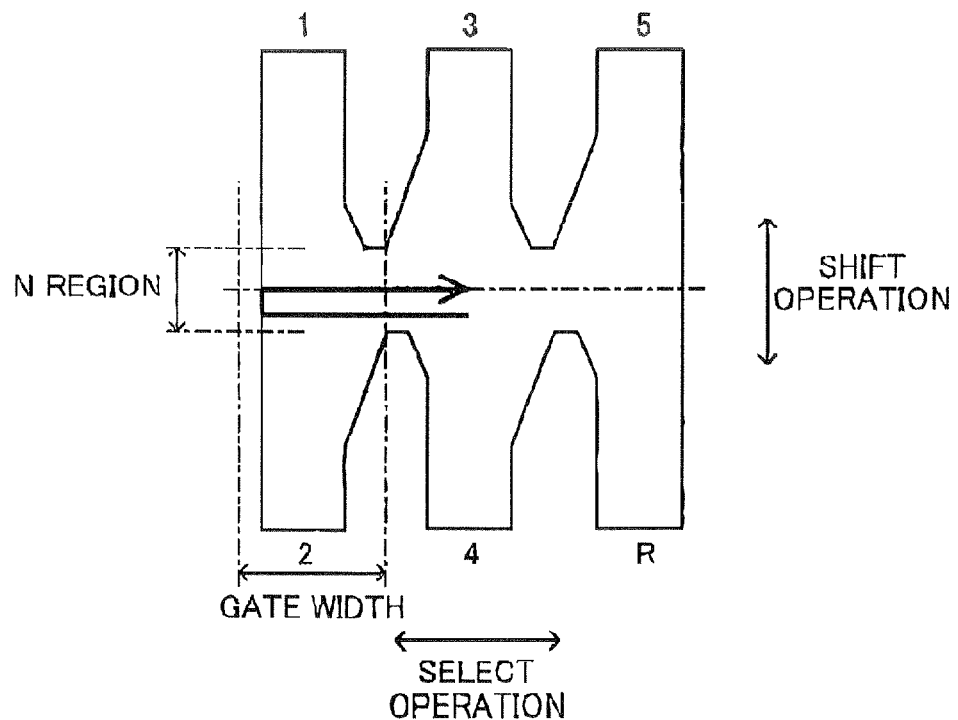
FIG. 6 A view illustrating another example of the determination method for the condition that "the shift position of the shift lever is in neutral".

An additional description is now given of a method of determining that "the shift position is in neutral". As illustrated in FIGS. 5 and 6, a case is assumed where respective shift operations of the shift lever corresponding to a plurality of gear positions (in FIGS. 5 and 6, first gear to fifth gear, and reverse gear) is achieved by moving the position of the shift lever, by a select operation (operation in the widthwise direction of the vehicle), to a corresponding select position, and, then, by a shift operation (operation in the lengthwise direction of the vehicle), from the corresponding select position to a corresponding shift position (namely, as a shift pattern, a so-called "H pattern" is employed).

In this case, the determination that "the shift position is in neutral" can be made based on a condition that a travel amount of the shift lever in the select operation (select stroke) exceeds a predetermined amount (for example, a gate width) as illustrated in FIGS. 5 and 6. Specifically, first, when the travel amount of the shift lever in the shift operation exceeds the predetermined amount, a position of the shift lever in the shift operation direction during the select operation is set to "N". The "position of the shift lever in the shift operation direction during the select operation" is, for example, the position itself of the shift lever in the shift operation direction when the travel amount of the shift lever exceeds the predetermined amount, that is, an average value of the change in position of the shift lever in the shift operation direction during the select operation, or the like. Then, a region in which the position of the shift lever in the shift operation direction is "N±α" is set as "N region". Then, based on a condition that the position of the shift lever in the shift operation direction is within a range of the "N region", the determination that "the shift position is in neutral" can be made. Note that, the "N region" may be set based on a variation range (maximum/minimum) of the position of the shift lever in the shift operation direction during the select operation.

Alternatively, the determination that "the shift position is in neutral" may be made based on a condition that a ratio (speed reduction ratio) of the rotation speed of the input shaft of the manual transmission M/T to the rotation speed of the output shaft does not coincide with any one of known speed reduction ratios (respective speed reduction ratios of the first to fifth gears, and the reverse gear) of the plurality of gear positions.

The invention claimed is:

1. A power transmission control device for a vehicle, which is to be applied to a vehicle comprising an internal combustion engine and an electric motor as power sources, the power transmission control device comprising:
   a transmission including an input shaft for receiving an input of a power from an output shaft of the internal combustion engine, an output shaft for outputting a power to a drive wheel of the vehicle, and a plurality of gear positions, one of which is selected based on a shift position of a shift operation member operated by a driver, the electric motor having an output shaft connected to the input shaft of the transmission;
   a friction clutch interposed between the output shaft of the internal combustion engine and the input shaft of the transmission for selectively realizing an engaged state, which is a state in which the power is transmitted, and a disengaged state, which is a state in which the power is not transmitted, based on an operation on a clutch operation member operated by the driver;
   first detection means for detecting an operation amount on the clutch operation member;
   second detection means for detecting the shift position of the shift operation member; and
   control means for controlling an internal-combustion-engine torque, which is a drive torque of the output shaft of the internal combustion engine, and an electric-motor torque, which is a drive torque of the output shaft of the electric motor,
   wherein the control means drives, based on satisfaction of a charge condition including a determination that the detected shift position is a driving force non-requesting position corresponding to a state in which a power transmission route is not realized between the output shaft of the electric motor and the output shaft of the transmission, and a determination, based on the detected operation amount of the clutch operation member, that the friction clutch is in the engaged state, the electric motor as an electric power generator by using the internal-combustion-engine torque, and charges, by using electric energy acquired by electric power generation by the electric power generator, a battery for supplying the electric motor with the electric energy,
   wherein the driving force non-requesting position is a neutral position, and
   wherein:
   respective shift operations of the shift operation member corresponding to the plurality of gear positions are configured to be achieved by moving, by a select operation, which is an operation in a widthwise direction of the vehicle, a position of the shift operation member to a corresponding select position, and then by moving, by a shift operation, which is an operation in a lengthwise direction of the vehicle, the position of the shift operation member from the corresponding select position to a corresponding shift position; and
   the control means is configured to determine that, based on a condition that, in the select operation, a travel amount of the shift operation member exceeds a predetermined amount, the detected shift position is the neutral position.

2. A power transmission control device for a vehicle according to claim 1, wherein the charge condition includes a determination that an amount of energy accumulated in the battery is less than a predetermined value.

3. A power transmission control device for a vehicle according to claim 2, wherein the charge condition includes a determination that an acceleration operation member operated by the driver to accelerate the vehicle is not being operated.

4. A power transmission control device for a vehicle according to claim 1, wherein the control means is configured to start, in a case where the internal combustion engine is stopping when the charge condition is satisfied, the internal combustion engine to generate the internal-combustion-engine torque.

5. A power transmission control device for a vehicle according to claim 1, wherein:
   respective shift operations of the shift operation member corresponding to the plurality of gear positions are configured to be achieved by moving, by a select operation, which is an operation in a widthwise direction of the vehicle, a position of the shift operation member to a corresponding select position, and then by moving, by a shift operation, which is an operation in a lengthwise direction of the vehicle, the position of the shift operation member from the corresponding select position to a corresponding shift position; and the control means is configured to determine that, based on a condition that a speed reduction ratio, which is a ratio of a rotation speed of an input shaft of the transmission to a rotation speed of an output shaft of the transmission, does not coincide with any one of known speed reduction ratios of the plurality of gear positions, the detected shift position is the neutral position.

6. A power transmission control device for a vehicle according to claim 1, wherein the control means drives, based on satisfaction of a second charge condition including determination that the detected shift position is the driving force non-requesting position, and a determination that, based on the detected operation amount of the clutch operation member, the friction clutch is in the disengaged state, an alternator driven by the internal-combustion-engine torque by using the internal-combustion-engine torque, thereby charging the battery by using electric energy acquired by electric power generation by the alternator.

* * * * *